US010104353B2

(12) United States Patent
Jackson

(10) Patent No.: US 10,104,353 B2
(45) Date of Patent: *Oct. 16, 2018

(54) SCANNING PROJECTOR WITH FEEDBACK FROM BORDER FIXTURE

(71) Applicant: Microvision, Inc., Redmond, WA (US)

(72) Inventor: Robert James Jackson, Monroe, WA (US)

(73) Assignee: Microvision, Inc., Redmond, WA (US)

( * ) Notice: Subject to any disclaimer, the term of this patent is extended or adjusted under 35 U.S.C. 154(b) by 24 days.

This patent is subject to a terminal disclaimer.

(21) Appl. No.: 15/478,951

(22) Filed: Apr. 4, 2017

(65) Prior Publication Data

US 2017/0214898 A1   Jul. 27, 2017

Related U.S. Application Data

(63) Continuation of application No. 14/978,766, filed on Dec. 22, 2015, now Pat. No. 9,693,029.

(51) Int. Cl.
*G02B 26/08* (2006.01)
*H04N 9/31* (2006.01)
(Continued)

(52) U.S. Cl.
CPC .......... *H04N 9/3194* (2013.01); *G01J 1/0425* (2013.01); *G01J 1/0466* (2013.01); *G02B 3/0006* (2013.01); *G02B 26/101* (2013.01); *G02B 26/105* (2013.01); *G02B 27/0101* (2013.01); *H04N 3/08* (2013.01); *H04N 9/14* (2013.01); *H04N 9/3135* (2013.01); *H04N 9/3161* (2013.01); *G02B 2027/011* (2013.01)

(58) Field of Classification Search
CPC ................ G02B 26/105; G02B 26/101; G02B 26/0833; G02B 26/085; G02B 26/0841; G02B 3/0006; G02B 27/0101; G02B 2027/011; B41J 2/47; B41J 2/471; H04N 9/3194; H04N 9/3135; H04N 3/08; H04N 9/14; H04N 9/3161; G01J 1/0425; G01J 1/0466
USPC ................................ 359/198.1, 224.1–226.1
See application file for complete search history.

(56) References Cited

U.S. PATENT DOCUMENTS 4,684,996 A   8/1987   Baumeister
8,159,913 B2   4/2012   Nishizawa
(Continued)

FOREIGN PATENT DOCUMENTS

JP   62-219790   9/1987
JP   2001-061122   3/2001

OTHER PUBLICATIONS

Microvision, Inc. "International Search Report and Written Opinion".

*Primary Examiner* — Euncha Cherry
(74) *Attorney, Agent, or Firm* — Kevin D. Wills

(57) ABSTRACT

A scanning projector and method is provided that generates a feedback signal from at least one photodetector. In the scanning projector, a scanning mirror is configured to reflect laser light into an image region and an over scanned region. The at least one photodetector is configured to receive a portion of the reflected laser light impacting the over scanned region, and provides the feedback signal responsive to the received portion of light. This feedback signal can then be used to provide precise control of the scanning mirror.

20 Claims, 12 Drawing Sheets

(51) Int. Cl.
*G02B 3/00* (2006.01)
*G02B 26/10* (2006.01)
*G01J 1/04* (2006.01)
*G02B 27/01* (2006.01)
*H04N 3/08* (2006.01)
*H04N 9/14* (2006.01)

(56) References Cited

U.S. PATENT DOCUMENTS

| | | |
|---|---|---|
| 9,693,029 B1 * | 6/2017 | Jackson ............. G02B 27/0101 |
| 2004/0119811 A1 | 6/2004 | Bush |
| 2009/0091623 A1 | 4/2009 | Krogstad |
| 2010/0033691 A1 | 2/2010 | Hung et al. |

* cited by examiner

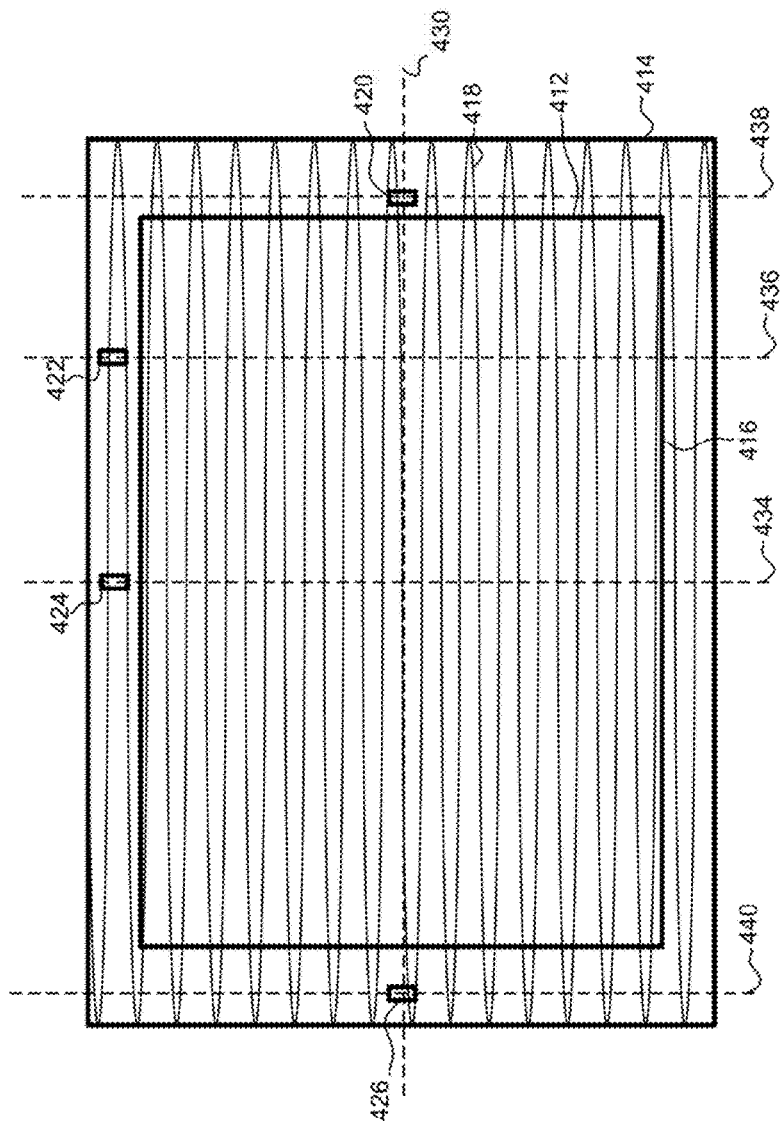

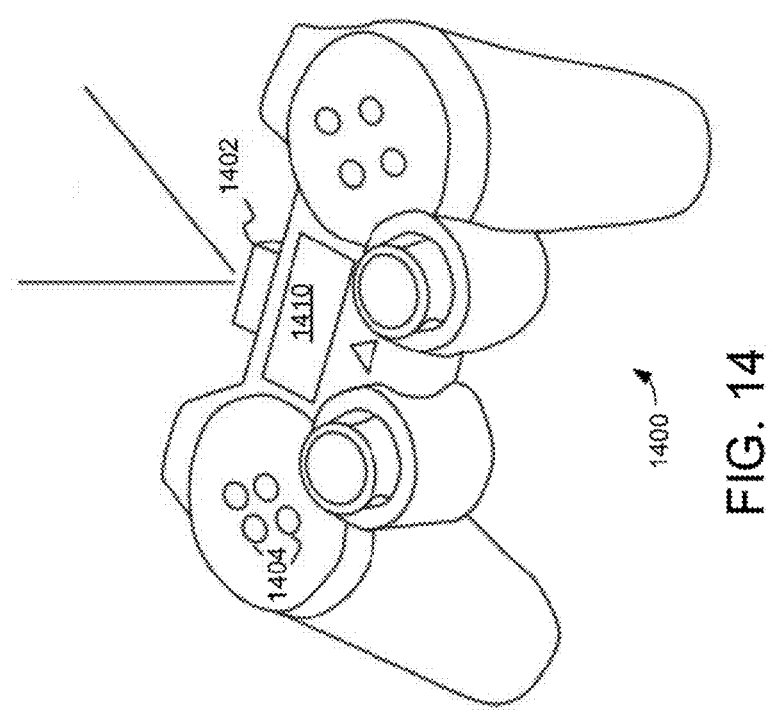

SCANNING PROJECTOR WITH FEEDBACK FROM BORDER FIXTURE

FIELD

The present disclosure generally relates to projectors, and more particularly relates to scanning projectors.

BACKGROUND

In scanning projectors, pixels are typically generated by modulating light from laser light sources as a scanning mirror scans the modulated light in a raster pattern. This use of a scanning mirror to scan the modulated light requires relatively precise control of the scanning mirror. Specifically, the physical motion of the scanning must be precisely controlled to facilitate an accurate scan of the modulated light in the raster pattern. Unfortunately, previous techniques for monitoring and controlling the physical motion of the scanning mirror can be insufficiently precise for some scanning projector applications.

BRIEF DESCRIPTION OF THE DRAWINGS

FIG. 4 shows a schematic diagram of an exemplary image region and over scanned region in accordance with various embodiments of the present invention;

FIG. 14 shows a perspective view of a gaming apparatus in accordance with various embodiments of the present invention.

DESCRIPTION OF EMBODIMENTS

Figure 1:
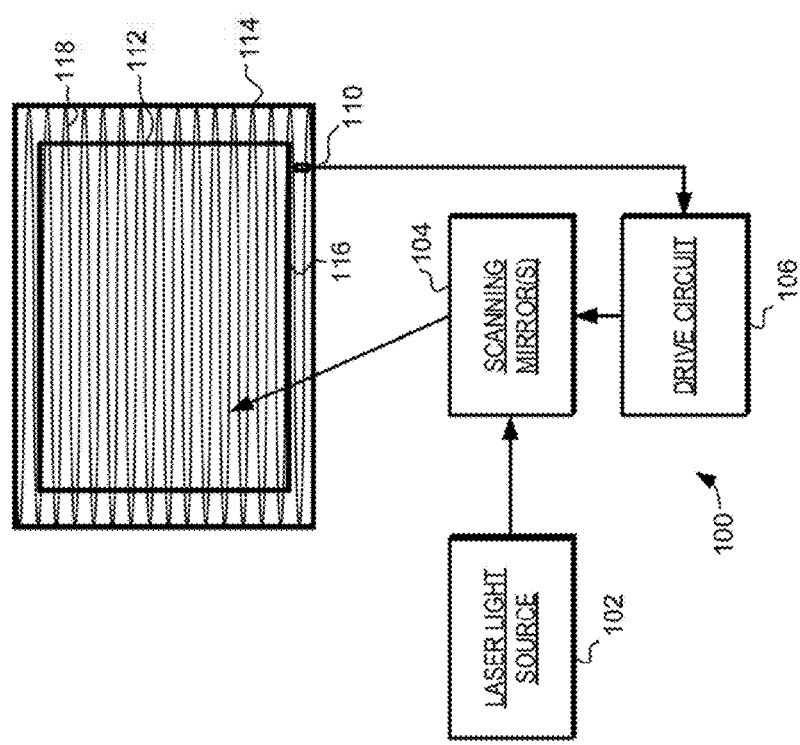
FIG. 1 shows a schematic diagram of a scanning laser projector in accordance with various embodiments of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

In general, the embodiments described herein provide a scanning projector that uses at least one photodetector to generate a feedback signal, and uses the feedback signal to control a scanning mirror in the projector. In the scanning projector the scanning mirror is configured to reflect light into an image region and an over scanned region. The at least one photodetector is configured to receive a portion of the reflected light impacting the over scanned region, and provides the feedback signal responsive to the received portion of light. This feedback signal can then be used to provide precise control of the scanning mirror, and thus can provide improved performance in the scanning projector. As one example, this feedback signal can be used to compensate for variations in the operational environment, such as temperature changes, source voltage changes, etc. If such operational environment changes are not compensated for they could otherwise cause inaccuracies in the control of the scanning mirror, and result in unacceptable degradations in the image quality produced by the scanning projector.

Turning now to FIG. 1, a schematic diagram of a scanning laser projector 100 is illustrated. The scanning laser projector 100 includes a laser light source 102, scanning mirror(s) 104, and a drive circuit 106. During operation, the laser light source 102 provides laser light that is encoded with pixel data to generate image pixels that are to be projected by the scanning laser projector 100. To facilitate this, the drive circuit 106 controls the movement of the scanning mirror(s) 104. Specifically, the drive circuit 106 provides excitation signal(s) to excite motion of the scanning mirror(s) 104.

The scanning mirror(s) 104 reflect the laser light into an image region 112 and an over scanned region 114, where the image region 112 is defined by a perimeter 116. Specifically, during operation of the scanning light projector 100, the scanning mirror(s) 104 are controlled by the drive circuit 104 to reflect the laser light into a raster pattern 118, with the raster pattern 118 covering the image region 112 and extending into the over scanned region 114.

In accordance with the embodiments described herein, at least one photodetector 110 is configured to receive a portion of the reflected laser light impacting the over scanned region 114. This photodetector 110 is configured to provide a feedback signal responsive to the portion of the reflected laser light received by the photodetector 110. This feedback signal is provided to the drive circuit 106, and is used by the drive circuit 106 to accurately control the motion of the scanning mirror(s) 104. Specifically, in one embodiment the drive circuit 106 modifies the excitation signal in response to the feedback signal, thus facilitating precise control of the motion of the scanning mirror(s) 104. Such precise control of the scanning mirror(s) 104 can facilitate improved image quality, and can further facilitate new usages and applications for the scanning laser projector 100.

In some embodiments, the feedback signal indicates the timing of various scans in the raster pattern 118 impacting the photodetectors 110. For example, the feedback signal can indicate a photodetector entry time corresponding to when the reflected laser light first impacts the photodetector 110 during a particular horizontal scan, and likewise indicates a photodetector exit time corresponding to when the reflected laser light last impacts the photodetector 110 during that same horizontal scan.

To facilitate precise control the scanning mirrors 104 by the drive circuit 106, the feedback signal can be used to determine and control various operational parameters of the scanning mirrors 104. For example, the feedback signal can be used to determine and control the horizontal scan amplitude, horizontal phase alignment, and/or vertical scan amplitude of the scanning mirrors 104 and resulting raster pattern 118.

In general, the horizontal scan amplitude is a measure of the horizontal sweep of the raster pattern 118. In the embodiments described herein, the horizontal scan amplitude can be calculated using the timing of the laser light hitting the photodetectors 110, the position of the photodetectors 110, and the frequency of the horizontal scanning. The horizontal phase alignment is likewise a measure of horizontal position of the raster pattern 118. Such a horizontal phase alignment can be calculated using the feedback signal by determining a timing difference between left and right sweeping scans in the raster pattern 118. The vertical scan amplitude is likewise a measure of the vertical sweep of the raster pattern 118. The vertical scan amplitude can be calculated using the feedback signal by determining the number of scans crossing the photodetector 110. Detailed examples of such embodiments will be described in greater detail below.

The image region 112 and perimeter 116 can be implemented and defined in various ways. For example, in some embodiments, the image region 112 can be defined by an opening surrounded by a border fixture or by a microlens array (MLA). Examples of such embodiments will be described in greater detail below with reference to FIGS. 5 and 6.

In some embodiments, an optical waveguide can used to direct light to the photodetector 110. In such an embodiment, the waveguide can be coupled between the photodetector 110 and an aperture that is positioned proximate to the perimeter 116 such that the aperture receives the portion of the reflected laser light impacting the over scanned region 114 and the optical waveguide transmits the portion of the reflected light to the photodetector 110. Furthermore, in such embodiments the aperture and/or waveguide can be implemented together with the border fixture or MLA defining the perimeter 116.

In some embodiments, the photodetector 110 can be positioned off axis relative to the horizontal scan direction of the reflected laser light. In such an embodiment, the horizontal scan of the reflected laser light will cross the photodetector at a non-orthogonal angle. As will be described in greater detail below, such an embodiment can be used to determine a precise vertical position of a particular horizontal scan.

In some embodiments, multiple photodetectors 110 can be implemented. For example, a second photodetector 110 can be configured to receive a second portion of the reflected laser light impacting the over scanned region 114. Such a second photodetector 110 can be configured to provide a second feedback signal responsive to the second portion of the reflected laser light impacting the second photodetector 110. As will be described below, such embodiments can be used to provide additional accuracy and precision to the drive circuit 106. In one such embodiment, the first photodetector 110 can be positioned proximate to a horizontal edge of the perimeter 116, while the second photodetector 110 is positioned proximate to a vertical edge of the perimeter 116.

A variety of devices can be used as the photodetector 110. Examples of such devices include silicon photodiodes, phototransistors, or other photosensitive devices, including other photosensitive semiconductor devices. In a typical embodiment, the photodetector 110 can be dimensionally small relative to the horizontal scan amplitude. For example, the photodetector 110 can have a sensor width of about 6% the horizontal scan amplitude. However, this is just one example, and devices of other sizes can be used.

It should be noted that in the description of the various embodiments herein, the distinction between vertical and horizontal is somewhat arbitrary, since a rotation of the scanning laser projector 100 will cause a rotation of the two axes. Accordingly, the various embodiments of the present invention are not to be limited by the terms "horizontal" and "vertical".

Figure 2:
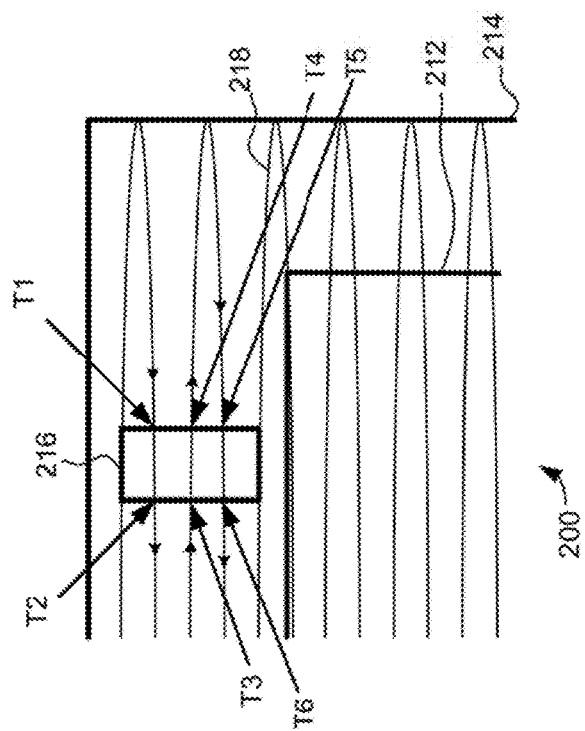
FIG. 2 shows a schematic diagram of portion of an exemplary image region and over scanned region in accordance with various embodiments of the present invention.

Turning now to FIG. 2, a schematic diagram of portion of an exemplary image region 212 and over scanned region 214 is illustrated. Like the embodiment of FIG. 1, pixel-modulated laser light is reflected by one or more scanning mirrors into a raster pattern 218. Also like the embodiment of FIG. 1, the raster pattern 218 is projected into image region 212 and extends into the over scanned region 214. The scanning of pixel-modulated laser light into the raster pattern 218 generates an image in the area corresponding to the image region 212.

It should again be noted that the raster pattern 218 is not illustrated to scale. For example, a typical raster pattern 218 would include a significantly greater number of horizontal scan lines, with the number of horizontal scan lines corresponding to a vertical scan rate in the raster pattern 218. Additionally, the line illustrating the raster pattern 218 does not represent the actual size of the laser beam creating the raster pattern 218.

FIG. 2 shows an expanded view of a photodetector 216 positioned in the over scanned region 214 to more clearly indicate how the reflected laser light can be detected by the photodetector 216 and used to generate a feedback signal. Specifically, in this illustrated embodiment the reflected laser light impacts the sensing region of photodetector 216 at T1, as indicated in FIG. 2. As the scan continues, the reflected laser light exits the photodetector 216 at T2. T1 and T2 thus correspond to a photodetector entry time and photodetector exit time. This process continues in the next horizontal scan. Specifically, the reflected laser light again impacts sensing region of the photodetector 216 at T3 and then again exits the photodetector at T4. T3 and T4 thus correspond to a second photodetector entry time and second photodetector exit time. Finally, the reflected light again impacts the sensing region at T5 and exits at T6.

The output of the photodetector 216 during these times can be used to generate a corresponding feedback signal. By detecting these entry and exit times and providing such information in a feedback signal, the photodetector 216 can be used to provide for enhanced feedback control. For example, the feedback signal can be used to determine horizontal scan amplitude, horizontal phase alignment, and/ or vertical scan amplitude, and provide feedback control of the mirrors based on one or more of those parameters.

Specifically, knowing the frequency of the horizontal scan, the position and sensing width of the photodetector 216, and the entry and exit times of a horizontal scan a precise determination of the horizontal scan amplitude can be calculated and controlled. For example, in a device that uses a MEMS mirror the motion of the mirror is sinusoidal to very high fidelity. In such an embodiment, the trigonometric relationship can be used to very precisely calculate the horizontal amplitude of the sinusoidal motion. With such a calculation performed, the drive circuit (e.g., drive circuit 106) can use the horizontal scan amplitude for feedback control of the scanning mirrors (e.g., scanning mirrors 104).

It should be noted that such a calculation can be performed with feedback data from only one scan hitting the photodetector 216. Thus, T1 and T2 are sufficient to calculate the horizontal scan amplitude. However, multiple crossings of the photodetector can be used to improve accuracy. In such a case, the data from additional entry and exit times (e.g., the times of T1, T2, T3 and T4) can be averaged or otherwise combined together to provide greater accuracy in the horizontal scan amplitude measurement.

A feedback signal generated from the photodetector 216 can also be used to determine the horizontal phase alignment, where the horizontal phase alignment defines the horizontal position in time of the raster pattern 218. In such an embodiment the timing difference between the left and right sweeping scans can be calculated and used to determine horizontal phase alignment. For example, the time between T2 and T3 corresponds to the time of a left sweeping scan between those points. Likewise, the time between T4 and T5 corresponds to the time of a right sweeping scan between those points. The time difference between the left sweeping scan and the right sweeping scan can be calculated. This time difference, along with the known position of the photodetector can be used to determine the horizontal phase alignment of the raster pattern 218. With such a calculation performed, the horizontal phase alignment can be used to correct the timing of the laser light source (e.g., laser light source 102) to provide precise alignment between the pixels generated by the laser light source and the scanning mirrors (e.g., scanning mirrors 104).

Specifically, a feedback signal generated from the photodetector 216 can be used to control the pixel alignment relative to the horizontal scan position. In such an embodiment, the feedback signal or data derived from the feedback signal can be provided to a pixel drive generator or other such element coupled to the laser light source. The feedback signal can then be used to control the laser light and provide pixel alignment of the laser light with the scanning mirror. In this embodiment the position of the pixel being generated by the laser light source can be precisely controlled and thus precisely aligned. In one application, such an embodiment can be used to ensure that pixels are aligned with lensets in the microlens array. A description of such an embodiment will be described in greater detail below.

A feedback signal generated from the photodetector 216 can also be used to determine the vertical scan amplitude of the raster pattern 218. For example, the vertical scan amplitude can be determined by counting the number of sweeps that occur across the photodetector 216 during an image frame. In one example, the vertical scan amplitude can be adjusted by the drive circuit such that a specified number of sweeps cross the photodetector 216.

Figure 3:
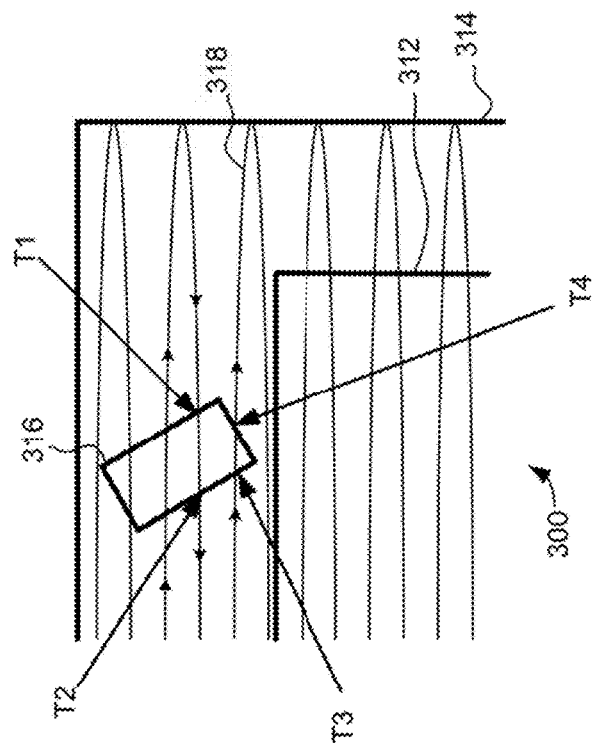
FIG. 3 shows a schematic diagram of portion of an exemplary image region and over scanned region in accordance with various embodiments of the present invention.

Turning now to FIG. 3, a schematic diagram of portion of an exemplary image region 312 and over scanned region 214 is illustrated. Like the embodiment of FIGS. 1 and 2, pixel-modulated laser light is reflected by one or more scanning mirrors into a raster pattern 318. This raster pattern 218 is projected into the image region 312 and extends into the over scanned region 314.

FIG. 3 again shows an expanded view of a photodetector 316 positioned in the over scanned region 314. In this embodiment, the photodetector 316 is positioned off-axis relative to the horizontal scan direction of the reflected laser light. This off-axis position causes the horizontal scan of the reflected laser light to cross the photodetector 316 at a non-orthogonal angle relative to the photodetector 316.

In this illustrated embodiment, the reflected laser light impacts the sensing region of photodetector 316 at T1. As the scan continues, the reflected laser light exits the photodetector 316 at T2. T1 and T2 thus correspond to a photodetector entry time and photodetector exit time. This process continues in the next horizontal scan. Specifically, the reflected laser light again impacts sensing region of the photodetector 316 at T3 and then again exits the photodetector at T4. T3 and T4 thus correspond to a second photodetector entry time and second photodetector exit time.

Like the embodiment illustrated in FIG. 2, the photodetector 316 and the entry and exit times can be used to determine and control the horizontal scan amplitude, horizontal phase alignment, and/or vertical scan amplitude. For example, these parameters can be calculated and used for feedback control using the various techniques described above with reference to FIG. 2.

Furthermore, the off-axis arrangement of the photodetector 316 further facilitates precise determination of the vertical position of a scan impacting the end of the photodetector 316. The precise determination of the vertical position of scan can be calculated using by determining the entry time and exit time of scan that crosses a bottom corner of the photodetector 316. For example, the time between T3 and T1 can be used to determine where along the bottom of the photodetector 316 the scan crossed. Notably, as a scan moves up in this bottom corner of the photodetector 316, the portion of the photodetector 316 crossed by the scan becomes wider. Conversely, as the scan moves down, the portion of the photodetector 316 crossed by the scan becomes narrower.

This difference in the portion of the photodetector 316 crossed by the scan at different vertical positions can be used to accurately determine the vertical position of a particular scan. Specifically, by calculating the time between T3 and T4, and knowing the frequency of the horizontal scan and the position of the photodetector 316, the precise vertical position of the scan impacting the off-axis bottom edge of the photodetector 316 can be determined. A feedback signal generated from the photodetector 316 can thus be used by the drive circuit adjust the scanning mirrors and resulting vertical position of the raster scan 318.

In another embodiment, the amplitude of the output of the photodetector 316 generated during a scan crossing can be measured and used to determine vertical position of the scan. In such an embodiment, the larger the portion of the photodetector 316 that is crossed by the scan, the higher the amplitude of the photodetector 316 output and vice versa.

Turning now to FIG. 4, a schematic diagram of an exemplary image region 412 and over scanned region 414 is illustrated, with the image region 412 defined by a perimeter 416. Like the embodiment of FIG. 1, pixel-modulated laser light is reflected by one or more scanning mirrors into a raster pattern 418.

In accordance with the embodiments described herein, photodetectors 420, 422, 424 and 426 are each configured to receive a portion of the reflected laser light impacting the over scanned region 414. Each of the photodetectors 420, 422, 424 and 426 are configured to provide a feedback signal responsive to their respective received portion of the reflected laser light. Such feedback signals can then be provided to a drive circuit and used by the drive circuit to accurately control the motion of the scanning mirror used to generate the raster pattern 418.

In the embodiment of FIG. 4 the various photodetectors are arranged in locations that together provide effective information for feedback control of the scanning mirrors. It should be first noted that photodetectors 422 and 424 are positioned proximate a horizontal edge of the perimeter 416. Conversely, photodetectors 420 and 426 are positioned proximate to a vertical edge of the perimeter 416.

Furthermore, the photodetectors are positioned at locations that correspond to different horizontal scan amplitudes. In FIG. 4, the line 434 represents the center of the horizontal scan path, and thus the line 434 represents a location where a horizontal scan is at zero amplitude. Likewise, line 436 represents a midpoint to the maximum horizontal scan amplitude, and thus represents a location where the horizontal scan amplitude is at 50% of maximum. Likewise, lines 438 and 440 respectively represent locations where the horizontal scan amplitude is 90% and 95% percent of maximum.

It should be noted that these locations of different scan amplitude also have corresponding different rates of motion. Specifically, the rate of motion in the scanning mirror (and in the resulting raster pattern 418 is higher near the center of the horizontal scan path and decreases as the amplitude increases. Furthermore, it should be noted that positioning photodetectors at areas of higher horizontal scan amplitude facilitates improved horizontal scan amplitude, while positioning photodetectors at areas of lower horizontal scan amplitude facilitates improved horizontal phase determination.

In this illustrated embodiment, photodetector 424 is arranged to detect the reflected light at approximately zero horizontal scan amplitude, photodetector 422 is arranged to detect the reflected light at approximately 50% of the horizontal scan amplitude, photodetector 420 is arranged to detect the reflected light at approximately 90% of the horizontal scan amplitude, and photodetector 426 is arranged to detect the reflected light at approximately 95% of the horizontal scan amplitude.

Thus, in the example of FIG. 4, photodetectors 420 and 426 could be configured and used to accurately determine horizontal scan amplitude based on their positions corresponding to relatively high percentages (90% and 95%) of the horizontal scan amplitude. Likewise, photodetector 424 could be configured and used to determine horizontal phase alignment based on its position at the center of the horizontal scan. The photodetector 422 at midpoint of the horizontal scan amplitude provides a compromise position that could be effectively used for both horizontal scan amplitude determination and horizontal phase alignment determination.

As was describe above, the image region and over scanned region can be defined and implemented in a variety of ways. For example, the image region can be implemented to include a microlens array. In general, microlens arrays are optical devices that include an arrangement of micro-lenses, commonly referred to as lenslets. Such microlens arrays can be fabricated from a variety of materials and with a variety of techniques. Microlens arrays can include one or two dimensional arrangements of lenslets formed on or with a supporting substrate. The individual lenslets can have apertures of different shapes, including circular and hexagonal. Microlens arrays can be used in a variety of applications, including eyewear and head-up displays (HUD). Examples of such applications will be discussed below.

Figure 5:
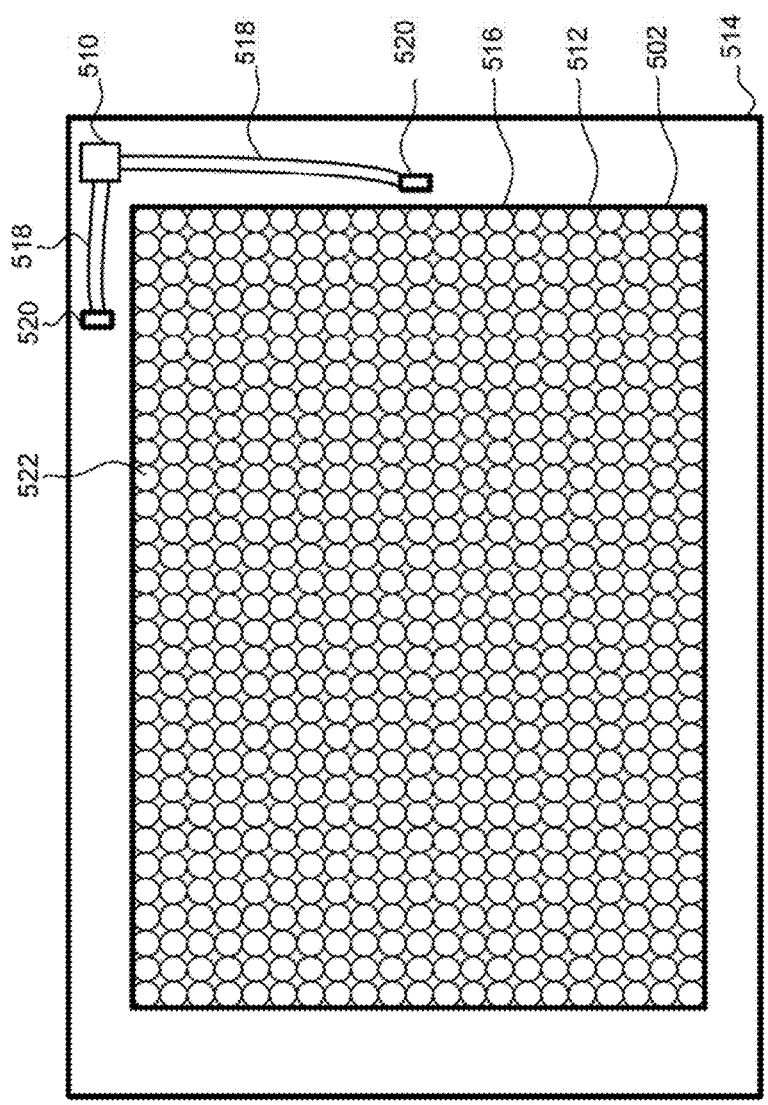
FIG. 5 shows an exemplary device that includes a microlens array in accordance with various embodiments of the present invention.

Turning now to FIG. 5, an exemplary device 500 includes a microlens array (MLA) 502, where the MLA 502 defines an image region 512, an over scanned region 514, and a perimeter 516. The MLA 502 includes a plurality of lenslets 522. During operation, the plurality of lenslets 522 receives the reflected laser light in the image region 512 and optically delivers the light in a form that can be used to generate an image.

In accordance with the embodiments described herein, a photodetector 510 is configured to receive a portion of the reflected laser light impacting the over scanned region 514. In this embodiment, this arrangement is provided by using optical waveguides 518. Specifically, each optical waveguides 518 is coupled between the photodetector 510 and a corresponding aperture 520. The apertures 520 are positioned proximate to the perimeter 516 such that the each aperture 520 receives a portion of the reflected laser light impacting the over scanned region 514 and the corresponding optical waveguide 518 transmits the portion of the reflected light to the photodetector 510.

Such an arrangement allows one photodetector 510 to detect reflected light impacting the over scanned region 514 at multiple locations. Such an arrangement is possible because the scanning of the reflected laser light is such that the light hits only one location at a time. Thus, one photodetector 510 can be used to provide a feedback signal responsive to the light impacting at multiple locations in the over scanned region 514.

It should be noted that while FIG. 5 illustrates the photodetector 510 inside the over scanned region 514 that in other embodiments the use of the optical waveguides 520 can facilitate the placement of the photodetector outside the overs scanned region. In some applications the placement of the photodetector 510 is limited only by the effective transmission ability of the optical waveguides 518.

The optical waveguides 518 can be implemented with a variety of structures and devices. As one example, the optical waveguides 518 can implemented with optical fibers, where the optical fibers are arranged to extend from the apertures 520 to the photodetector 510. In other embodiments the optical waveguides 518 can be implemented with strip waveguides, rectangular waveguides, rib waveguides, and segmented waveguides, to list a few non-limiting examples.

In one embodiment, the optical waveguides 518 can be implemented as part of the MLA 512. Specifically, the optical waveguides 518 could be formed with or otherwise integrated with the MLA 512. For example, the optical waveguides 518 could be fabricated with the MLA 512 as part of the fabrication process used to form the MLA 512.

It should be noted that in some applications the use of an MLA 512 can require precise pixel alignment relative to the MLA 512. Specifically, depending on the size and arrangement of the lenslets in the MLA 512, it can be required to ensure that each pixel is generated by the laser light source at a time in the horizontal scan that accurately corresponds to the position of a particular lenslet 522 in the array. This helps ensure that each pixels hits the appropriate lenslet 522 in the MLA 512. A feedback signal generated from the photodetector can be used to control the pixel alignment relative to the horizontal scan position and ensure such a proper pixel alignment. In such an embodiment the feedback signal or data derived from the feedback signal can be provided to a pixel drive generator and used to control the at least one source of laser light to provide pixel alignment of the laser light with the scanning mirror.

Another way in which the image region and overs canned region can be defined is with a border fixture. In such an embodiment, the border fixture defines an opening, where the opening resides in a virtual plane through which the reflected light in the image region passes. Such an arrangement can be used in a variety of applications, including scanning projectors. Examples of such applications will be discussed below.

Figure 6:
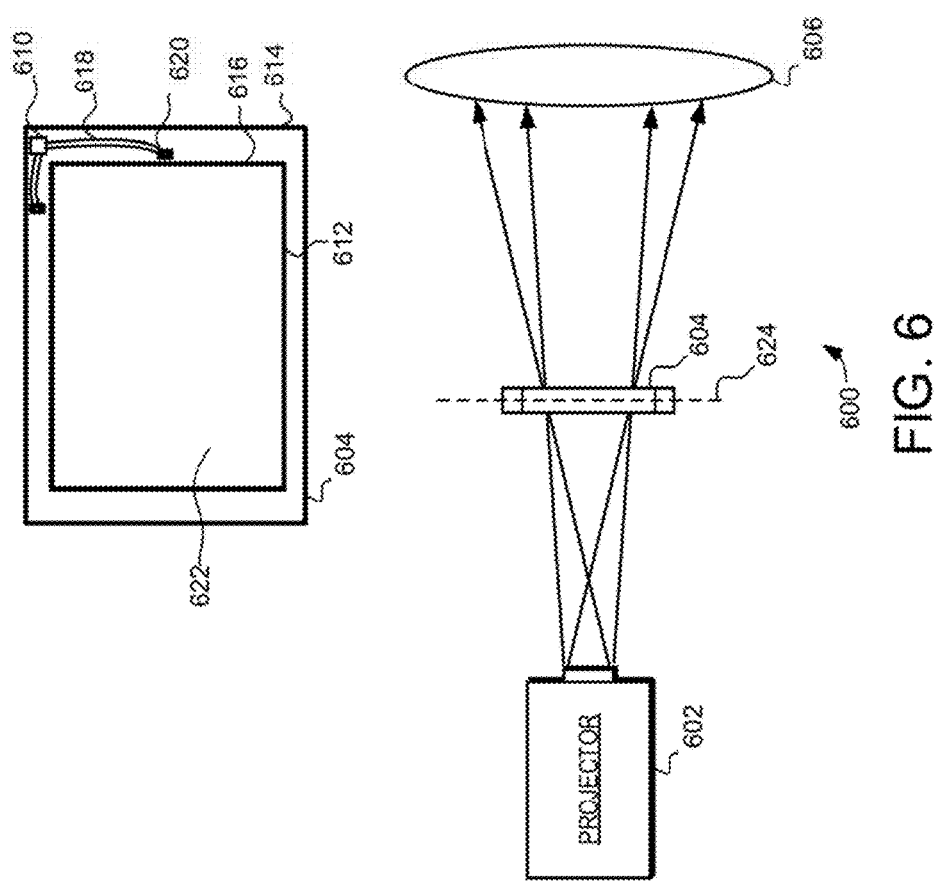
FIG. 6 shows an exemplary device that includes a projector in accordance with various embodiments of the present invention.

Turning now to FIG. 6, an exemplary device 600 includes a projector 602, a border fixture 604, and system optics 606. Note that in FIG. 6 both a side view of a front view of the border fixture 604 are illustrated. The border fixture 604 defines an image region 612, an over scanned region 614, and a perimeter 616. The border fixture 604 defines an opening 622. As configured, the opening 622 resides in a virtual plane represented by line 624. During operation light outputted by the projector 602 passes through the opening 622 at the virtual plane and impacts the system optics 606.

In accordance with the embodiments described herein, a photodetector 610 is configured to receive a portion of the reflected laser light impacting the over scanned region 614. In this embodiment, this arrangement is provided by using optical waveguides 618. Specifically, each optical waveguide 618 is coupled between the photodetector 610 and a corresponding aperture 620. The apertures 620 are positioned proximate to the perimeter 616 such that the each aperture 620 receives a portion of the reflected laser light impacting the over scanned region 614 and the corresponding optical waveguide 618 transmits the portion of the reflected light to the photodetector 610.

Figure 7:
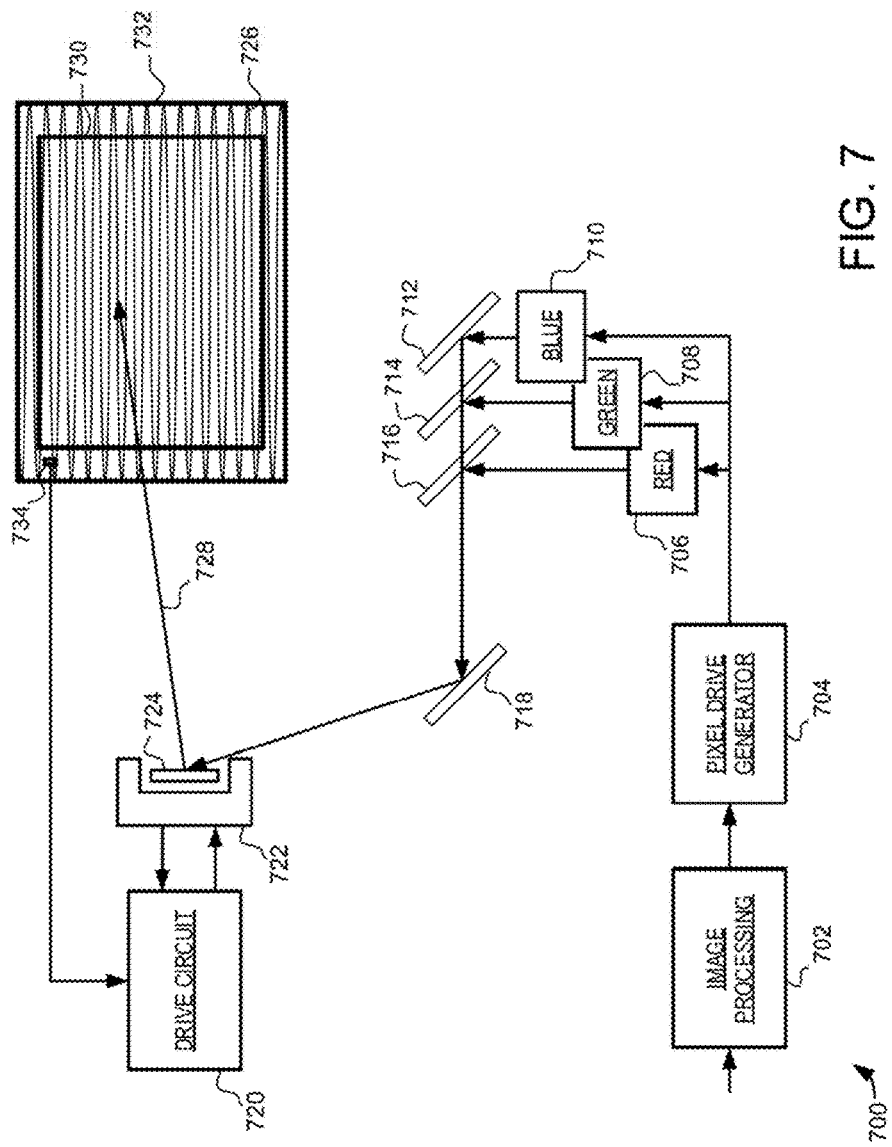
FIG. 7 shows a schematic view of a scanning laser projector in accordance with various embodiments of the present invention.

Turning now to FIG. 7, a schematic view of a scanning laser projector 700 is illustrated. The scanning laser projector 700 is an example of the type of system that can be used in accordance with various embodiments of the present invention. Scanning laser projector 700 includes an image processing component 702, a pixel drive generator 704, a red laser module 706, a green laser module 708, and a blue laser module 710. Light from the laser modules is combined with dichroics 712, 714, and 716. Scanning laser projector 700 also includes fold mirror 718, drive circuit 720, and MEMS device 722 with scanning mirror 724.

In operation, image processing component 702 processes video content at using two dimensional interpolation algorithms to determine the appropriate spatial image content for each scan position at which an output pixel is to be displayed by the pixel drive generator. For example, the video content may represent a grid of pixels at any resolution (e.g., 640×480, 848×480, 1280×720, 1920×1080). The input light intensity encoding typically represents the light intensity in 8, 10, 12 bit or higher resolutions.

This content is then mapped to a commanded current for each of the red, green, and blue laser sources such that the output intensity from the lasers is consistent with the input image content. In some embodiments, this process occurs at output pixel rates in excess of 150 MHz. The laser beams are then directed onto an ultra-high speed gimbal mounted 2 dimensional bi-axial laser scanning mirror 724. In some embodiments, this bi-axial scanning mirror is fabricated from silicon using MEMS processes. The vertical axis of rotation is operated quasi-statically and creates a vertical sawtooth raster trajectory. The vertical axis is also referred to as the slow-scan axis. The horizontal axis is operated on a resonant vibrational mode of the scanning mirror. In some embodiments, the MEMS device uses electromagnetic actuation, achieved using a miniature assembly containing the MEMS die and small subassemblies of permanent magnets and an electrical interface, although the various embodiments are not limited in this respect. For example, some embodiments employ electrostatic or piezoelectric actuation. Any type of mirror actuation may be employed without departing from the scope of the present invention.

The horizontal resonant axis is also referred to as the fast-scan axis. In some embodiments, raster pattern 726 is formed by combining a sinusoidal component on the horizontal axis and a sawtooth component on the vertical axis. In these embodiments, output beam 728 sweeps back and forth left-to-right in a sinusoidal pattern, and sweeps vertically (top-to-bottom) in a sawtooth pattern with the display blanked during flyback (bottom-to-top).

It should be noted that FIG. 7 illustrates the sinusoidal pattern as the beam sweeps vertically top-to-bottom, but does not show the flyback from bottom-to-top. In other embodiments, the vertical sweep is controlled with a triangular wave such that there is no flyback. In still further embodiments, the vertical sweep is sinusoidal. The various embodiments of the invention are not limited by the waveforms used to control the vertical and horizontal sweep or the resulting raster pattern 726.

The drive circuit 720 provides a drive signal to MEMS device 722. The drive signal includes an excitation signal to control the resonant angular motion of scanning mirror 724 on the fast-scan axis, and also includes slow scan drive signal to cause deflection on the slow-scan axis. The resulting mirror deflection on both the fast and slow-scan axes causes output beam 728 to generate a raster scan 726 in both an image region 730 and an over scanned region 732. In operation, the laser light sources produce light pulses for each output pixel and scanning mirror 724 reflects the light pulses as beam 728 traverses the raster pattern 726. Drive circuit 720 also receives a feedback signal from MEMS device 722. The feedback signal from the MEMS device 722 can describe the maximum deflection angle of the mirror, also referred to herein as the amplitude of the feedback signal.

In accordance with the embodiments described herein, at least one photodetector 734 is configured to receive a portion of the reflected laser light impacting the over scanned region 732. This photodetector 734 is configured to provide a feedback signal responsive to the portion of the reflected laser light received by the photodetector 110. This feedback signal is provided to the drive circuit 720, and is used by the drive circuit 720 to accurately control the motion of the scanning mirror 724.

In operation, drive circuit 720 excites resonant motion of scanning mirror 724 such that the amplitude of the feedback signal is constant. This provides for a constant maximum angular deflection on the fast-scan axis as shown in raster pattern 726. The excitation signal used to excite resonant motion of scanning mirror 724 can include an amplitude and a phase. Drive circuit 720 includes feedback circuit(s) that modifies the excitation signal amplitude to keep the feedback signal amplitude substantially constant. Additionally, the drive circuit 720 can modify the excitation signal to control the horizontal phase alignment and vertical position of the raster pattern 726.

To facilitate this, drive circuit 720 may be implemented in hardware, a programmable processor, or in any combination. For example, in some embodiments, drive circuit 720 is implemented in an application specific integrated circuit (ASIC). Further, in some embodiments, some of the faster data path control is performed in an ASIC and overall control is provided by a software programmable microprocessor.

Although red, green, and blue laser light sources are shown in FIG. 7, the various embodiments are not limited by the wavelength of light emitted by the laser light sources. For example, in some embodiments, non-visible light (e.g., infrared light) is emitted instead of, or in addition to, visible light.

It should be noted that while FIG. 7 illustrates an embodiment with a single MEMS device 722 and a single scanning mirror 724, that this is just one example implementation. As another example, a scanning laser projector could instead be implemented with scanning mirror assembly that includes two scanning mirrors, with one mirror configured to deflect along one axis and another mirror configured to deflect along a second axis that is largely perpendicular to the first axis.

Such an embodiment could include a second MEMS device, a second scanning mirror, and a second drive circuit. The first scanning mirror could be configured to generate horizontal scanning motion, and the second scanning mirror configured to generate vertical motion. Thus, the motion of one scanning mirror determines the horizontal scan amplitude and the motion of the other scanning mirror determines the vertical scan amplitude.

In such an embodiment, each of the photodetectors (e.g., photodetector 734 of FIG. 7) can be configured to generate a feedback signal that is provided to one or more drive circuits (e.g., drive circuit 720). The feedback signals can then be used by the first drive circuit to control the first scanning mirror and the resulting horizontal scan amplitude, and can be used by the second drive circuit to control the second scanning mirror and the resulting vertical scan amplitude. Thus, the photodetector(s) can be used to generate feedback signal(s) to facilitate accurate control of the motion of multiple scanning mirrors.

In operation, drive circuit 720 excites resonant motion of scanning mirror 724 such that the amplitude of the feedback signal is constant. This provides for a constant maximum angular deflection on the fast-scan axis as shown in raster pattern 726. The excitation signal used to excite resonant motion of scanning mirror 724 can include an amplitude and a phase. Drive circuit 720 includes feedback circuit(s) that modifies the excitation signal amplitude to keep the feedback signal amplitude substantially constant. Additionally, the drive circuit 720 can modify the excitation signal to control the horizontal phase alignment and vertical position of the raster pattern 726.

Figure 8:
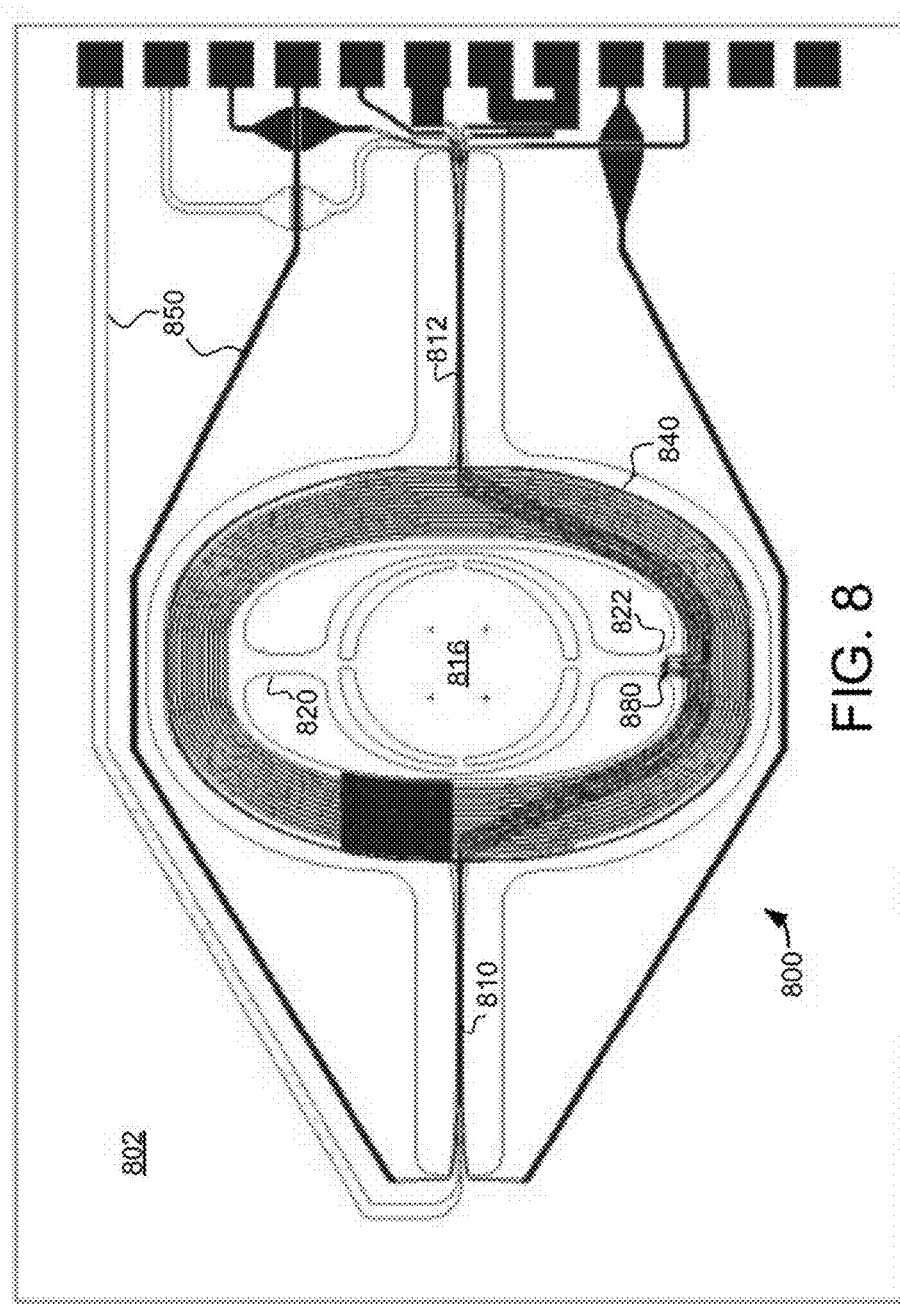
FIG. 8 shows a plan view of a microelectromechanical system (MEMS) device with a scanning mirror in accordance with various embodiments of the present invention.

Turning now to FIG. 8, a plan view of a microelectromechanical system (MEMS) device with a scanning mirror is illustrated. MEMS device 800 includes fixed platform 802, scanning platform 840, and scanning mirror 816. Scanning platform 840 is coupled to fixed platform 802 by flexures 810 and 812, and scanning mirror 16 is coupled to scanning platform 840 by flexures 820 and 822. Scanning platform 840 has a drive coil connected to drive lines 850, which are driven by a drive signal provided from a drive circuit (e.g., drive circuit 720). The drive signal includes an excitation signal to excite resonant motion of scanning mirror 816 on the fast-scan axis, and also includes a slow-scan drive signal to cause non-resonant motion of scanning platform 840 on the slow-scan axis. Current drive into drive lines 850 produces a current in the drive coil. In operation, an external magnetic field source (not shown) imposes a magnetic field on the drive coil. The magnetic field imposed on the drive coil by the external magnetic field source has a component in the plane of the coil, and is oriented non-orthogonally with respect to the two drive axes. The in-plane current in the coil windings interacts with the in-plane magnetic field to produce out-of plane Lorentz forces on the conductors. Since the drive current forms a loop on scanning platform 840, the current reverses sign across the scan axes. This means the Lorentz forces also reverse sign across the scan axes, resulting in a torque in the plane of and normal to the magnetic field. This combined torque produces responses in the two scan directions depending on the frequency content of the torque.

The long axis of flexures 810 and 812 form a pivot axis. Flexures 810 and 812 are flexible members that undergo a torsional flexure, thereby allowing scanning platform 840 to rotate on the pivot axis and have an angular displacement relative to fixed platform 802. Flexures 810 and 812 are not limited to torsional embodiments as shown in FIG. 8. For example, in some embodiments, flexures 810 and 812 take on other shapes such as arcs, "S" shapes, or other serpentine shapes. The term "flexure" as used herein refers to any flexible member coupling a scanning platform to another platform (scanning or fixed), and capable of movement that allows the scanning platform to have an angular displacement with respect to the other platform.

Scanning mirror 816 pivots on a first axis formed by flexures 820 and 822, and pivots on a second axis formed by flexures 810 and 812. The first axis is referred to herein as the horizontal axis or fast-scan axis, and the second axis is referred to herein as the vertical axis or slow-scan axis. In some embodiments, scanning mirror 816 scans at a mechanically resonant frequency on the horizontal axis resulting in a sinusoidal horizontal sweep. Further, in some embodiments, scanning mirror 816 scans vertically at a nonresonant frequency, so the vertical scan frequency can be controlled independently.

In a typical embodiment the MEMS device 800 will also incorporates one or more integrated piezoresistive position sensors. For example, piezoresistive sensor 880 can be configured to produces a voltage that represents the displacement of mirror 816 with respect to scanning platform 840, and this voltage can be provided back to the drive circuit. Furthermore, in some embodiments, positions sensors are provided on one scan axis while in other embodiments position sensors are provided for both axes.

It should be noted that the MEMS device 800 is provided as an example, and the various embodiments of the invention are not limited to this specific implementation. For example, any scanning mirror capable of sweeping in two dimensions to reflect a light beam in a raster pattern may be incorporated without departing from the scope of the present invention. Also for example, any combination of scanning mirrors (e.g., two mirrors: one for each axis) may be utilized to reflect a light beam in a raster pattern. Further, any type of mirror drive mechanism may be utilized without departing from the scope of the present invention. For example, although MEMS device 800 uses a drive coil on a moving platform with a static magnetic field, other embodiments may include a magnet on a moving platform with drive coil on a fixed platform. Further, the mirror drive mechanism may include an electrostatic drive mechanism.

The scanning laser projectors described above (e.g., scanning laser projector 100 of FIG. 1) can be implemented in a wide variety of devices and for a wide variety of applications. Several specific examples of these types of devices will not be discussed with reference to FIGS. 9-14. In each case, the various embodiments described above can be implemented with or as part of such a device.

Figure 9:
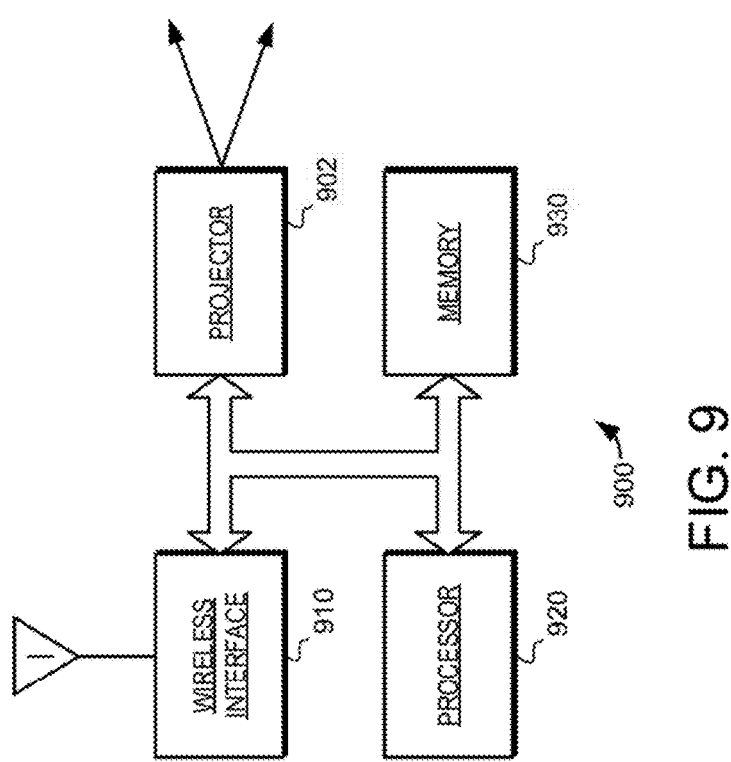
FIG. 9 shows a block diagram of a mobile device in accordance with various embodiments of the present invention.

Turning to FIG. 9, a block diagram of a mobile device 900 in accordance with various embodiments is illustrated. Specifically, mobile device 900 is an example of the type of device in which a scanning laser projector as described above can be implemented (e.g., scanning laser projector 100, scanning laser projector 700). As shown in FIG. 9, mobile device 900 includes wireless interface 910, processor 920, memory 930, and scanning laser projector 902. Scanning laser projector 902 includes photodetector(s) configured in an over scanned region signal to provide feedback signal(s) as described above. Scanning laser projector 902 may receive image data from any image source.

For example, in some embodiments, scanning laser projector 902 includes memory that holds still images. In other embodiments, scanning laser projector 902 includes memory that includes video images. In still further embodiments, scanning laser projector 902 displays imagery received from external sources such as connectors, wireless interface 910, a wired interface, or the like.

Wireless interface 910 may include any wireless transmission and/or reception capabilities. For example, in some embodiments, wireless interface 910 includes a network interface card (NIC) capable of communicating over a wireless network. Also for example, in some embodiments, wireless interface 910 may include cellular telephone capabilities. In still further embodiments, wireless interface 910 may include a global positioning system (GPS) receiver. One skilled in the art will understand that wireless interface 910 may include any type of wireless communications capability without departing from the scope of the present invention.

Processor 920 may be any type of processor capable of communicating with the various components in mobile device 900. For example, processor 920 may be an embedded processor available from application specific integrated circuit (ASIC) vendors, or may be a commercially available microprocessor. In some embodiments, processor 920 provides image or video data to scanning laser projector 100. The image or video data may be retrieved from wireless interface 910 or may be derived from data retrieved from wireless interface 910. For example, through processor 920, scanning laser projector 902 may display images or video received directly from wireless interface 910. Also for example, processor 920 may provide overlays to add to images and/or video received from wireless interface 910, or may alter stored imagery based on data received from wireless interface 910 (e.g., modifying a map display in GPS embodiments in which wireless interface 910 provides location coordinates).

Figure 10:
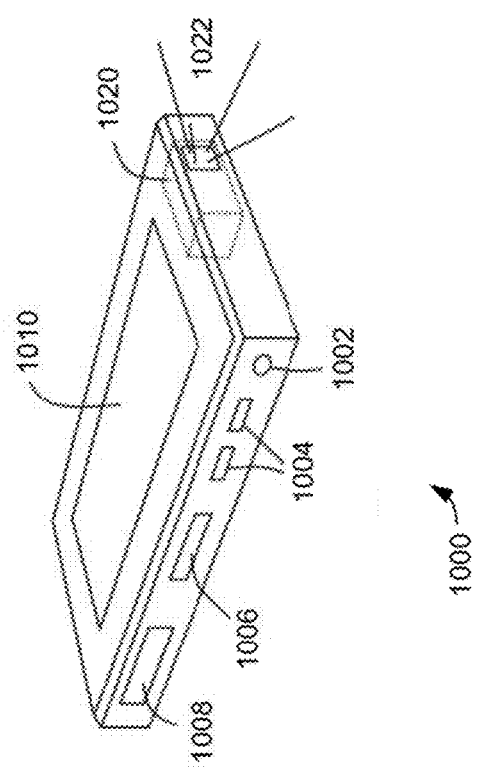
FIG. 10 shows a perspective view of a mobile device in accordance with various embodiments of the present invention.

Turning to FIG. 10, a perspective view of a mobile device 1000 in accordance with various embodiments is illustrated. Specifically, mobile device 1000 is an example of the type of device in which a scanning laser projector as described above can be implemented (e.g., scanning laser projector 100, scanning laser projector 700). Mobile device 1000 may be a hand held scanning laser projector with or without communications ability. For example, in some embodiments, mobile device 1000 may be a scanning laser projector with little or no other capabilities. Also for example, in some embodiments, mobile device 1000 may be a device usable for communications, including for example, a cellular phone, a smart phone, a tablet computing device, a global positioning system (GPS) receiver, or the like. Further, mobile device 1000 may be connected to a larger network via a wireless (e.g., cellular), or this device can accept and/or transmit data messages or video content via an unregulated spectrum (e.g., WiFi) connection.

Mobile device 1000 includes scanning laser projector 1020, touch sensitive display 1010, audio port 1002, control buttons 1004, card slot 1006, and audio/video (A/V) port 1008. None of these elements are essential. For example, mobile device may only include scanning laser projector 1020 without any of touch sensitive display 1010, audio port 1002, control buttons 1004, card slot 1006, or A/V port 1008. Some embodiments include a subset of these elements. For example, an accessory projector may include scanning laser projector 1020, control buttons 1004 and A/V port 1008. A smartphone embodiment may combine touch sensitive display device 1010 and projector 1020.

Touch sensitive display 1010 may be any type of display. For example, in some embodiments, touch sensitive display 1010 includes a liquid crystal display (LCD) screen. In some embodiments, display 1010 is not touch sensitive. Display 1010 may or may not always display the image projected by scanning laser projector 1020. For example, an accessory product may always display the projected image on display 1010, whereas a mobile phone embodiment may project a video while displaying different content on display 1010. Some embodiments may include a keypad in addition to touch sensitive display 1010. A/V port 1008 accepts and/or transmits video and/or audio signals. For example, A/V port 1008 may be a digital port, such as a high definition multimedia interface (HDMI) interface that accepts a cable suitable to carry digital audio and video data. Further, A/V port 1008 may include RCA jacks to accept or transmit composite inputs. Still further, A/V port 1008 may include a VGA connector to accept or transmit analog video signals.

In some embodiments, mobile device 1000 may be tethered to an external signal source through A/V port 1008, and mobile device 1000 may project content accepted through A/V port 1008. In other embodiments, mobile device 1000 may be an originator of content, and A/V port 1008 is used to transmit content to a different device.

Audio port 1002 provides audio signals. For example, in some embodiments, mobile device 1000 is a media recorder that can record and play audio and video. In these embodiments, the video may be projected by scanning laser projector 1020 and the audio may be output at audio port 1002.

Mobile device 1000 also includes card slot 1006. In some embodiments, a memory card inserted in card slot 1006 may provide a source for audio to be output at audio port 1002 and/or video data to be projected by scanning laser projector 1020. Card slot 1006 may receive any type of solid state memory device, including for example secure digital (SD) memory cards.

Figure 11:
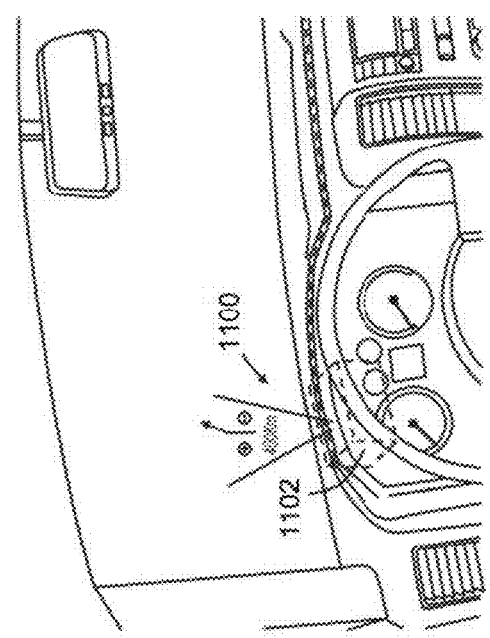
FIG. 11 shows a perspective view of a head-up display system in accordance with various embodiments of the present invention.
Figure 13:
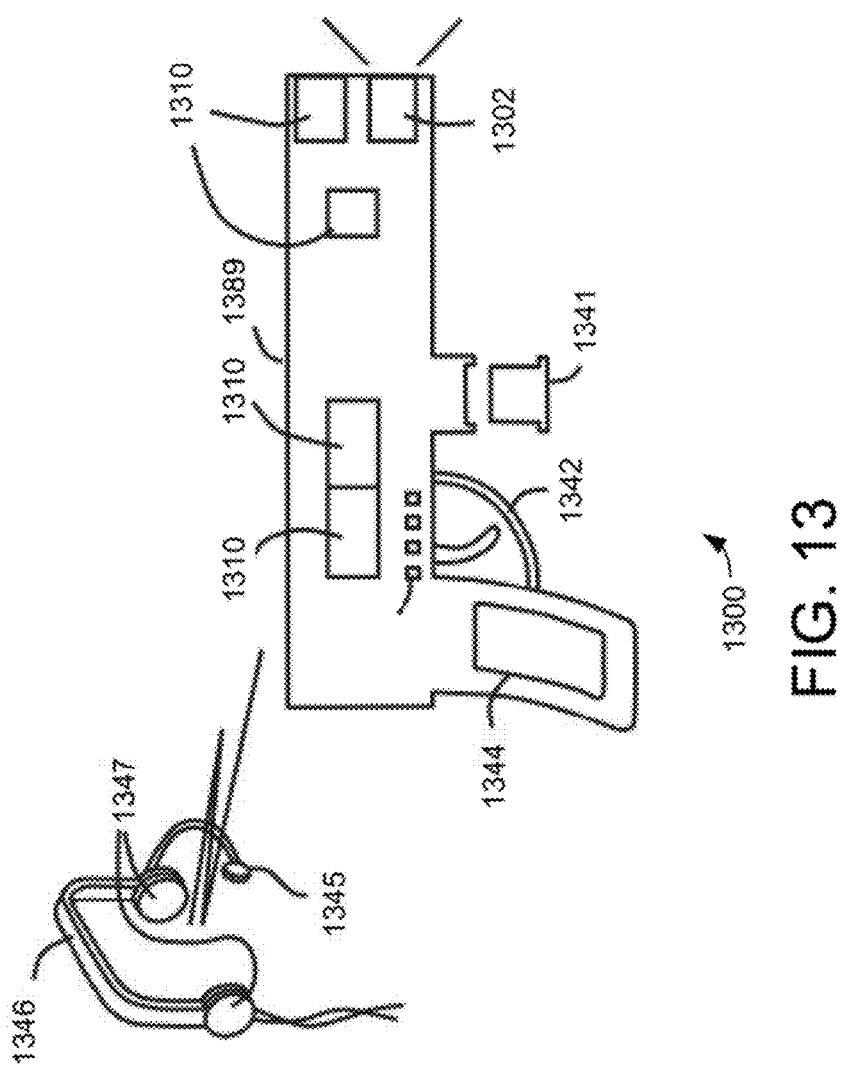
FIG. 13 shows a perspective view of a gaming apparatus in accordance with various embodiments of the present invention.

Turning to FIG. 11, a perspective view of a head-up display system 1100 in accordance with various embodiments is illustrated. Specifically, head-up display system 1100 is an example of the type of device in which a scanning laser projector as described above can be implemented (e.g., scanning laser projector 100, scanning laser projector 700). The head-up display system 1100 includes a scanning laser projector 1102. Specifically, the scanning laser projector 1102 is shown mounted in a vehicle dash to project the head-up display. Although an automotive head-up display is shown in FIG. 11, this is not a limitation and other applications are possible. For example, various embodiments include head-up displays in avionics application, air traffic control applications, and other applications.

Figure 12:
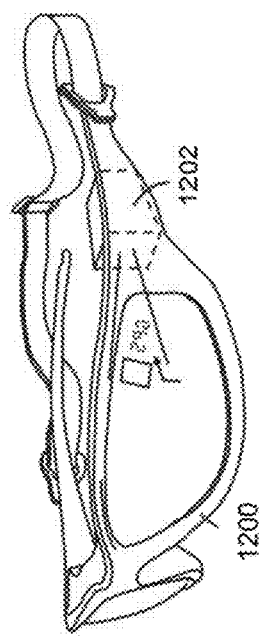
FIG. 12 shows a perspective view of eyewear in accordance with various embodiments of the present invention.

Turning to FIG. 12, a perspective view of eyewear 1200 in accordance with various embodiments is illustrated. Specifically, eyewear 1200 is an example of the type of device in which a scanning laser projector as described above can be implemented (e.g., scanning laser projector 100, scanning laser projector 700). Eyewear 1200 includes scanning laser projector 1202 to project a display in the eyewear's field of view. In some embodiments, eyewear 1200 is see-through and in other embodiments, eyewear 1200 is opaque. For example, eyewear 1200 may be used in an augmented reality application in which a wearer can see the display from projector 1202 overlaid on the physical world. Also for example, eyewear 1200 may be used in a virtual reality application, in which a wearer's entire view is generated by projector 1202.

Although only one projector 1202 is shown in FIG. 12, this is not a limitation and other implementations are possible. For example, in some embodiments, eyewear 1200 includes two projectors 1202, with one for each eye Turning to FIG. 13, a perspective view of a gaming apparatus 1300 in accordance with various embodiments is illustrated. Gaming apparatus 1300 allows a user or users to observe and interact with a gaming environment. In some embodiments, the game is navigated based on the motion, position, or orientation of gaming apparatus 1300, an apparatus that includes scanning laser projector 1302. Other control interfaces, such as manually-operated buttons, foot pedals, or verbal commands, may also contribute to navigation around, or interaction with the gaming environment. For example, in some embodiments, trigger 1342 contributes to the illusion that the user or users are in a first person perspective video game environment, commonly known as a "first person shooter game." Because the size and brightness of the projected display can be controlled by the gaming application in combination with the user's movement, gaming apparatus 1300 creates a highly believable or "immersive" environment for these users.

Many other first person perspective simulations can also be created by gaming apparatus 1300, for such activities as 3D seismic geo-prospecting, spacewalk planning, jungle canopy exploration, automobile safety instruction, medical education, etc. Tactile interface 1344 may provide a variety of output signals, such as recoil, vibration, shake, rumble, etc. Tactile interface 1344 may also include a touch-sensitive input feature, such as a touch sensitive display screen or a display screen that requires a stylus. Additional tactile interfaces, for example, input and/or output features for a motion sensitive probe are also included in various embodiments of the present invention.

Gaming apparatus 1300 may also include audio output devices, such as integrated audio speakers, remote speakers, or headphones. These sorts of audio output devices may be connected to gaming apparatus 1300 with wires or through a wireless technology. For example, wireless headphones 1346 provide the user with sound effects via a BLUETOOTH™ connection, although any sort of similar wireless technology could be substituted freely. In some embodiments, wireless headphones 1346 may include microphone 1345 or binaural microphone 1347, to allow multiple users, instructors, or observers to communicate. Binaural microphone 1347 typically includes microphones on each ear piece, to capture sounds modified by the user's head shadow. This feature may be used for binaural hearing and sound localization by other simulation participants.

Gaming apparatus 1300 may include any number of sensors 1310 that measure ambient brightness, motion, position, orientation, and the like. For example, gaming apparatus 1300 may detect absolute heading with a digital compass, and detect relative motion with an x-y-z gyroscope or accelerometer. In some embodiments, gaming apparatus 1300 also includes a second accelerometer or gyroscope to detect the relative orientation of the device, or its rapid acceleration or deceleration. In other embodiments, gaming apparatus 1300 may include a Global Positioning Satellite (GPS) sensor, to detect absolute position as the user travels in terrestrial space.

Gaming apparatus 1300 may include battery 1341 and/or diagnostic lights 1343. For example, battery 1341 may be a rechargeable battery, and diagnostic lights 1343 could indicate the current charge of the battery. In another example, battery 1341 may be a removable battery clip, and gaming apparatus 1300 may have an additional battery, electrical capacitor or super-capacitor to allow for continued operation of the apparatus while the discharged battery is replaced with a charged battery. In other embodiments, diagnostic lights 1343 can inform the user or a service technician about the status of the electronic components included within or connected to this device. For example, diagnostic lights 1343 may indicate the strength of a received wireless signal, or the presence or absence of a memory card.

Diagnostic lights 1343 could also be replaced by any small screen, such as an organic light emitting diode or liquid crystal display screen. Such lights or screens could be on the exterior surface of gaming apparatus 1300, or below the surface, if the shell for this apparatus is translucent or transparent. Other components of gaming apparatus 1300 may be removable, detachable or separable from this device. For example, scanning laser projector 1302 may be detachable or separable from gaming housing 1389. In some embodiments, the subcomponents of scanning laser projector 100 may be detachable or separable from gaming housing 1389, and still function.

Turning to FIG. 14, a perspective view of a gaming apparatus 1400 in accordance with various embodiments is illustrated. Gaming apparatus 1400 includes buttons 1404, display 1410, and projector 1402. In some embodiments, gaming apparatus 1400 is a standalone apparatus that does not need a larger console for a user to play a game. For example, a user may play a game while watching display 1410 and/or the projected content. In other embodiments, gaming apparatus 1400 operates as a controller for a larger gaming console. In these embodiments, a user may watch a larger screen tethered to the console in combination with watching display 1410 and/or projected content.

In one embodiment, a scanning laser projector is provided. The scanning laser projector, comprising: at least one source of laser light; a scanning mirror configured to reflect the laser light; a perimeter defining an image region inside the perimeter and an over scanned region outside the perimeter, the image region and over scanned region configured to receive the reflected laser light; a photodetector configured to receive a portion of the reflected laser light impacting the over scanned region outside the perimeter, the photodetector further configured to provide a feedback signal responsive to the portion of the reflected laser light received by the photodetector; and a drive circuit configured to provide an excitation signal to excite motion of the scanning mirror, the drive circuit configured to modify the excitation signal in response to the feedback signal.

In another embodiment, a method is provided. The method comprising: A method comprising: controlling motion of a scanning mirror to reflect laser light in a pattern across an image region inside a perimeter and across an over scanned region outside the perimeter; detecting a portion of the reflected laser light in the over scanned region; providing a feedback signal responsive to the detected portion of the reflected laser light; and modify the motion of the scanning mirror in response to the feedback signal.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. An apparatus comprising:
    at least one light source;
    a scanning mirror positioned to reflect light received from the at least one light source to create a scanning light beam that scans in an image region and an over scanned region;
    a border fixture having an opening through which the scanning light beam passes when scanning in the image region;
    a first photodetector positioned to detect light from the scanning light beam when scanning in the over scanned region on the border fixture; and
    a control circuit to excite the scanning mirror in response to a feedback signal received from the first photodetector.

2. The apparatus of claim 1 wherein the first photodetector is positioned relative to a horizontal scan of the scanning light beam such that a difference between a photodetector entry time and a photodetector exit time of the scanning light beam measured at the first photodetector is independent of a vertical position of the scanning light beam.

3. The apparatus of claim 1 wherein the first photodetector is positioned relative to a horizontal scan of the scanning light beam such that a difference between a photodetector entry time and a photodetector exit time of the scanning light beam measured at the first photodetector is dependent on a vertical position of the scanning light beam.

4. The apparatus of claim 1 further comprising a second photodetector positioned to detect light from the scanning light beam at a different location in the over scanned region, wherein the control circuit is responsive to a second feedback signal received from the second photodetector.

5. The apparatus of claim 4 wherein the first and second photodectors are positioned to detect light at different horizontal scan amplitudes.

6. The apparatus of claim 4 wherein the first photodetector is positioned to detect light adjacent to a horizontal edge of the over scanned region, and the second photodector is positioned to detect light adjacent to a vertical edge of the over scanned region.

7. An apparatus comprising:
    at least one light source;
    a scanning mirror positioned to reflect light received from the at least one light source;
    a border fixture having an opening through which a first portion of the light reflected by the scanning mirror passes, and an aperture through which a second portion of the light reflected by the scanning mirror passes;
    a waveguide coupled to the aperture to guide the second portion of the light;
    a photodetector coupled to receive the second portion of the light from the waveguide; and
    a control circuit to excite the scanning mirror in response to a feedback signal received from the photodetector.

8. The apparatus of claim 7 wherein the aperture is rectangular.

9. The apparatus of claim 8 wherein the aperture is positioned to be vertically and horizontally aligned relative to a vertical scan axis and a horizontal scan axis.

10. The apparatus of claim 8 wherein the aperture is positioned to be rotated off-axis relative to a vertical scan axis and a horizontal scan axis.

11. The apparatus of claim 7 wherein the aperture is shaped to provide a difference between a photodetector entry time and a photodetector exit time of the scanning light beam measured at the photodetector that is a function of vertical scanning light beam position.

12. The apparatus of claim 7 further comprising a plurality of apertures and a plurality of waveguides to couple the plurality of apertures to the photodetector.

13. The apparatus of claim 12 wherein a first aperture and a second aperture are positioned to detect light at different horizontal scan amplitudes.

14. The apparatus of claim 12 wherein a first aperture is positioned to detect light at a horizontal edge of the border fixture, and the second aperture is positioned to detect light at a vertical edge of the border fixture.

15. A scanning laser projector comprising:
    at least one laser light source;
    a scanning mirror assembly positioned to reflect light received from the at least one laser light source, and to scan the reflected light in a raster pattern in an image region and an over scanned region outside the image region;
    a border fixture positioned about the image region in a virtual plane, wherein light in the over scanned region impacts the border fixture;
    a photodetector positioned to receive a portion of the light in the over scanned region; and
    a control circuit to excite at least one scanning mirror in the scanning mirror assembly in response to a feedback signal received from the photodetector.

16. The scanning laser projector of claim 15 wherein the scanning mirror assembly includes two mirrors.

17. The scanning laser projector of claim 15 wherein the scanning mirror assembly includes one mirror.

18. The scanning laser projector of claim 15 wherein the photodetector is affixed to the border fixture.

19. The scanning laser projector of claim 15 further comprising a waveguide, wherein the waveguide guides light from an aperture in the border fixture to the photodetector.

20. The scanning laser projector of claim 15 further comprising a plurality of waveguides, wherein the plurality of waveguides guide light from a plurality of apertures in the border fixture to the photodetector.

* * * * *